US012262748B2

(12) United States Patent
Chen et al.

(10) Patent No.: US 12,262,748 B2
(45) Date of Patent: Apr. 1, 2025

(54) ATOMIZING DEVICE AND ELECTRONIC CIGARETTE

(71) Applicant: SHENZHEN FIRST UNION TECHNOLOGY CO., LTD., Shenzhen (CN)

(72) Inventors: Wei Chen, Shenzhen (CN); Ruilong Hu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 371 days.

(21) Appl. No.: 17/824,983

(22) Filed: May 26, 2022

(65) Prior Publication Data

US 2022/0279854 A1 Sep. 8, 2022

Related U.S. Application Data

(63) Continuation of application No. PCT/CN2020/132440, filed on Nov. 27, 2020.

(30) Foreign Application Priority Data

Nov. 27, 2019 (CN) ........................ 201911184333.3
Jan. 3, 2020 (CN) ........................ 202020021108.X

(51) Int. Cl.
*A24F 40/46* (2020.01)
*H05B 3/06* (2006.01)
*H05B 3/46* (2006.01)

(52) U.S. Cl.
CPC ............... *A24F 40/46* (2020.01); *H05B 3/06* (2013.01); *H05B 3/46* (2013.01); *H05B 2203/013* (2013.01)

(58) Field of Classification Search
CPC .. A24F 40/46; H05B 3/06; H05B 3/46; H05B 2203/013
See application file for complete search history.

(56) References Cited

U.S. PATENT DOCUMENTS 2,864,929 A * 12/1958 Schwing .................. H05B 3/06 219/536
5,322,075 A * 6/1994 Deevi ..................... A24F 40/46 131/194

(Continued)

FOREIGN PATENT DOCUMENTS

CN 108378426 A 8/2018
CN 207721209 U 8/2018

(Continued)

*Primary Examiner* — Thanh Tam T Le
(74) *Attorney, Agent, or Firm* — IPRO, PLLC

(57) ABSTRACT

The present application discloses a heater and an aerosol generating device. The heater includes: a base, having an inner surface; an infrared electrothermal coatings, being disposed on the inner surface of the base; a conductive module, comprising a first conductive portion and a second conductive portion arranged on the base, both the first conductive portion and the second conductive portion being electrically connected with the infrared electrothermal coating; wherein each of the first conductive portion and the second conductive portion includes a conductive portion coating section arranged on the inner surface of the base and a conductive portion electrode section arranged on an outer surface of the base.

17 Claims, 12 Drawing Sheets

(56) References Cited

U.S. PATENT DOCUMENTS

| | | | | | |
|---|---|---|---|---|---|
| 5,692,525 | A * | 12/1997 | Counts | A24D 3/17 | |
| | | | | 131/194 | |
| 7,286,752 | B2 * | 10/2007 | Gourand | H05B 3/46 | |
| | | | | 392/479 | |
| 8,678,014 | B2 | 3/2014 | Tsuruizumi et al. | | |
| 10,288,048 | B2 * | 5/2019 | Oehler | H05B 3/46 | |
| 10,721,965 | B2 * | 7/2020 | Lipowicz | H05B 3/40 | |
| 10,806,181 | B2 * | 10/2020 | Sur | A24F 40/46 | |
| 10,939,707 | B2 * | 3/2021 | Hejazi | A61M 15/06 | |
| 11,116,248 | B2 * | 9/2021 | Reevell | H05B 3/46 | |
| 11,154,091 | B2 * | 10/2021 | Reevell | A24F 40/46 | |
| 11,247,005 | B2 * | 2/2022 | Monsalud | A61M 15/0035 | |
| 11,265,974 | B2 * | 3/2022 | Sebastian | A24F 40/46 | |
| 11,517,048 | B2 * | 12/2022 | Tritz | A24B 15/167 | |
| 11,623,053 | B2 * | 4/2023 | Yilmaz | A24F 40/44 | |
| | | | | 131/329 | |
| 11,659,863 | B2 * | 5/2023 | Blandino | A24F 40/465 | |
| | | | | 392/386 | |
| 11,659,864 | B2 * | 5/2023 | Guo | H05B 3/48 | |
| | | | | 131/329 | |
| 11,819,051 | B2 * | 11/2023 | Reevell | A61M 11/042 | |
| 2018/0035720 | A1 | 2/2018 | Qiu | | |

FOREIGN PATENT DOCUMENTS

| | | | |
|---|---|---|---|
| CN | 109674093 | A | 4/2019 |
| CN | 109846093 | A | 6/2019 |
| CN | 110384264 | A | 10/2019 |
| CN | 211910545 | U | 11/2020 |
| CN | 108338415 | A | 5/2022 |

* cited by examiner

ATOMIZING DEVICE AND ELECTRONIC CIGARETTE

CROSS-REFERENCE TO RELATED APPLICATION

The application is based upon and claims priority to Chinese Patent Application No. 201911184333.3, filed with the Chinese Patent Office on Nov. 27, 2019, titled "HEATER AND SMOKING SET COMPRISING THE HEATER", and Chinese Patent Application No. 202020021108.X, filed with the Chinese Patent Office on Jan. 3, 2020, titled "AEROSOL GENERATING DEVICE AND INFRARED EMITTER FOR AEROSOL GENERATING DEVICE", the entire contents of which are incorporated herein by reference.

TECHNICAL FIELD

The present application relates to the technical field of smoking sets, and in particular, relates to a heater and an aerosol generating device.

BACKGROUND

Smoking articles such as cigarettes and cigars burn tobacco to produce smoke during use. Attempts have been made to provide substitutes for these tobacco-burning articles by producing products that release compounds without burning. Examples of such products are so-called incombustible products which do not burn when being heated and release compounds by heating instead of burning tobacco.

A smoking set currently available that does not burn when being heated at a low temperature is mainly coated with a far infrared coating and a conductive coating on an outer surface of a base, and the far infrared coating, after being powered on, emits far infrared rays to penetrate the base and heat the aerosol-forming matrix in the base. Because the far infrared rays have strong penetrability, they can penetrate the periphery of the aerosol-forming matrix and enter the aerosol-forming matrix, so that the aerosol-forming matrix can be heated evenly.

SUMMARY

In the first aspect, the embodiment of the present application discloses a heater. The heater includes a base, having an inner surface and an outer surface; an infrared electrothermal coating, being disposed on the inner surface of the base; the infrared electrothermal coating being configured to generate infrared radiation to heat aerosol-forming matrix so as to generate aerosol for smoking; a conductive module, comprising a first conductive portion and a second conductive portion arranged on the base, both the first conductive portion and the second conductive portion being electrically connected with the infrared electrothermal coating; wherein each of the first conductive portion and the second conductive portion comprises a conductive portion coating section arranged on the inner surface of the base and a conductive portion electrode section arranged on the outer surface of the base.

In the second aspect, the embodiment of the present application discloses an aerosol generating device for heating smokable materials to generate aerosol for smoking. The aerosol generating device includes a cavity for receiving the smokable materials, a heater and an electric core for supplying power to the heater. The heater includes a base, having a first surface opposite to the cavity and a second surface facing away from the cavity; a first infrared electrothermal coating formed on the first surface of the base, and a second infrared electrothermal coating formed on the second surface of the base; a first conductive element and a second conductive element attached to the base; wherein both the first infrared electrothermal coating and the second infrared electrothermal coating are coupled between the first conductive element and the second conductive element to radiate infrared rays at least to the cavity when they are powered on; the electric core comprises a first electrode and a second electrode; one of the first electrode and the second electrode is electrically connected with the first conductive element, and the other one of the first electrode and the second electrode is electrically connected with the second conductive element.

BRIEF DESCRIPTION OF THE DRAWINGS

The implementation of objectives of the present application as well as functional characteristics and advantages of the present application will be further explained with reference to attached drawings and in combination with embodiments. One or more embodiments are illustrated by the pictures in the corresponding drawings, and these illustrative descriptions do not constitute the limitation of the embodiments. Elements with the same reference numerals in the attached drawings represent similar elements, and unless otherwise stated, the figures in the attached drawings do not constitute scale limitation.

DETAILED DESCRIPTION

In order to facilitate the understanding of the present application, the present application will be explained in more detail below with reference to the attached drawings and detailed description. It shall be noted that, when an element is expressed as "fixed to" another element, it may be directly on another element, or there may be one or more intervening elements therebetween. When an element is expressed as "connected" to another element, it may be directly connected to another element, or there may be one or more intervening elements therebetween. The terms "up", "down", "left", "right", "inside", "outside" and similar expressions used in this specification are only for the purpose of illustration.

Unless otherwise defined, all technical and scientific terms used in this specification have the same meanings as commonly understood by those skilled in the art of the present application. In this specification, the terms used in the specification of the present application are only for the purpose of describing specific embodiments, and are not intended to limit the present application. The term "and/or" used in this specification comprises any and all combinations of one or more associated items listed.

The main disadvantage with the traditional heater is that: the far infrared coating is coated on the outer surface of the base, and the infrared rays emitted by the far infrared coating that is powered on suffer from heat loss when penetrating the base.

The heater and the aerosol generating device according to the present application may avoid the phenomenon in the existing smoking sets where the far infrared rays emitted by the far infrared coating that is powered on suffer from heat loss when penetrating the base, reduced the heat loss of infrared heating, and improved the efficiency of infrared heating, by the means of coating the infrared electrothermal coating on the inner surface of the base.

First Embodiment

Figure 1:
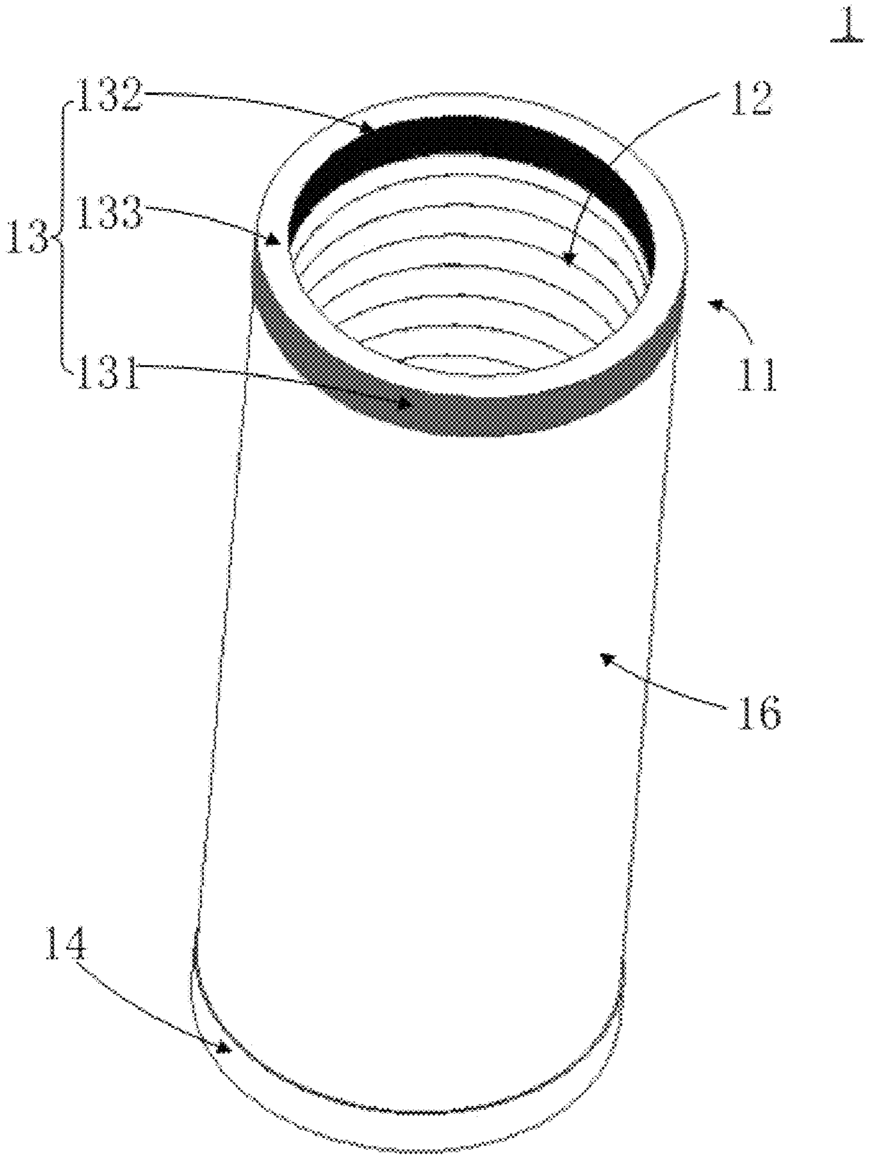
FIG. 1 is a schematic view of a heater according to a first embodiment of the present application.

A heater according to the first embodiment of the present application is as shown in FIG. 1. The heater 1 includes a base 11, a first infrared electrothermal coating 12 and conductive modules (13, 14).

A cavity suitable for containing aerosol-forming matrix is provided in the base 11.

Specifically, the base 11 has a first end 111 and a second end 112 relative to the length direction thereof, the base 11 extends along the longitudinal direction between the first end 111 and the second end 112, and the base 11 is hollow inside with a cavity suitable for containing the aerosol-forming matrix formed therein. The base 11 may have shapes of cylinder, prismoid or other columns. The base 11 is preferably cylindrical, then the cavity is a cylindrical hole penetrating through the middle of the base 11, and the inner diameter of the hole is slightly larger than the outer diameter of aerosol forming articles or smoking articles, so that the aerosol forming articles or smoking articles can be easily placed and heated in the cavity.

The base 11 may be made of high-temperature resistant and transparent materials such as quartz glass, ceramics or mica; or the base 11 may be made of other materials with higher infrared transmittance, such as high-temperature resistant materials with infrared transmittance above 95%. The base 11 may also be made of high-temperature resistant and non-transparent materials, and this is not particularly limited in the present application.

The aerosol-forming matrix is a matrix that can release volatile compounds which are capable of forming aerosol. Such volatile compounds may be released by heating the aerosol-forming matrix. The aerosol-forming matrix may be solid or liquid or comprise solid and liquid components. The aerosol-forming matrix may be adsorbed, coated, impregnated or otherwise loaded on a carrier or support. The aerosol-forming matrix may conveniently be part of an aerosol forming article or a smoking article.

The aerosol-forming matrix may include nicotine. The aerosol-forming matrix may include tobacco, for example, a tobacco-containing material containing volatile compounds with tobacco aroma, and the volatile compounds with tobacco aroma are released from the aerosol-forming matrix when they are heated. An alternative aerosol-forming matrix may include a homogeneous tobacco material, such as deciduous tobacco. The aerosol-forming matrix may include at least one aerosol-forming agent, and the aerosol-forming agent may be any suitable known compound or mixture of compounds. During use, the compound or mixture of compounds is conducive to the formation of dense and stable aerosol, and is basically resistant to thermal degradation at the operating temperature of the aerosol generating system. Suitable aerosol forming agents are well known in the art and comprise, but not limited to, polyols such as triethylene glycol, 1,3-butanediol and glycerol; esters of polyols, such as glycerin mono-, di- or triacetate; and fatty acid esters of mono-, di- or polycarboxylic acids, such as dimethyl dodecanedioate and dimethyl tetradecanedioate. The alternative aerosol forming agent is polyhydric alcohol or a mixture thereof, such as triethylene glycol, 1,3-butanediol and glycerine.

As mentioned in the previous description, the far infrared coating is coated on the outer surface of the base for the smoking sets currently available, and the far infrared rays emitted by the far infrared coating that is powered on will suffer from heat loss when penetrating the base. To avoid this phenomenon, in this embodiment, the first infrared electrothermal coating 12 is coated on the inner surface of the base 11.

The first infrared electrothermal coating 12 can generate heat energy when it is powered on, and then generate infrared rays of a certain wavelength, e.g., far infrared rays of 8 μm to 15 μm. When the wavelength of the infrared rays matches the absorption wavelength of the aerosol-forming matrix, the energy of infrared rays is easily absorbed by the aerosol-forming matrix. In this embodiment, the wavelength of the infrared rays is not limited, the infrared rays of 5 μm to 15 μm are possible. Alternatively, the far infrared rays can be 8 μm to 15 μm.

The first infrared electrothermal coating 12 is preferably made of far infrared electrothermal ink, ceramic powder and inorganic adhesive, which are stirred fully and uniformly and printed on the inner surface of the base 1, and then dried and cured for a certain time. The thickness of the first infrared electrothermal coating 12 is 30 μm to 50 μm. Alternatively, the first infrared electrothermal coating 12 may also be made of tin tetrachloride, tin oxide, antimony trichloride, titanium tetrachloride and anhydrous copper sulfate, which are mixed and stirred at a certain proportion and then coated on the inner surface of the base 1. Alternatively, the first infrared electrothermal coating 12 is one of a silicon carbide ceramic layer, a carbon fiber composite layer, a zirconium titanium oxide ceramic layer, a zirconium titanium nitride ceramic layer, a zirconium titanium boride ceramic layer, a zirconium titanium carbide ceramic layer, an iron oxide ceramic layer, an iron nitride ceramic layer, an iron boride ceramic layer, an iron carbide ceramic layer, a rare earth oxide ceramic layer, a rare earth nitride ceramic layer, a rare earth boride ceramic layer, a rare earth carbide ceramic layer, a nickel cobalt oxide ceramic layer, a nickel cobalt nitride ceramic layer, a nickel cobalt boride ceramic layer, a nickel cobalt carbide ceramic layer or a high-silica zeolite ceramic layer. The first infrared electrothermal coating 12 may also be a coating of other materials currently available.

In an embodiment, the heater 1 further includes a protective layer (not shown in the figure) coated on the first infrared electrothermal coating 12. The protective layer may be one of a polytetrafluoroethylene layer and a glaze layer or a combination of the poly-tetrafluoroethylene layer and the glaze layer, or a protective layer made of other high-temperature resistant materials. The protective layer can prevent the wear of the first infrared electrothermal coating 12 caused by, for example, the movement of the aerosol forming articles or smoking articles into or out of the cavity.

Figure 2:
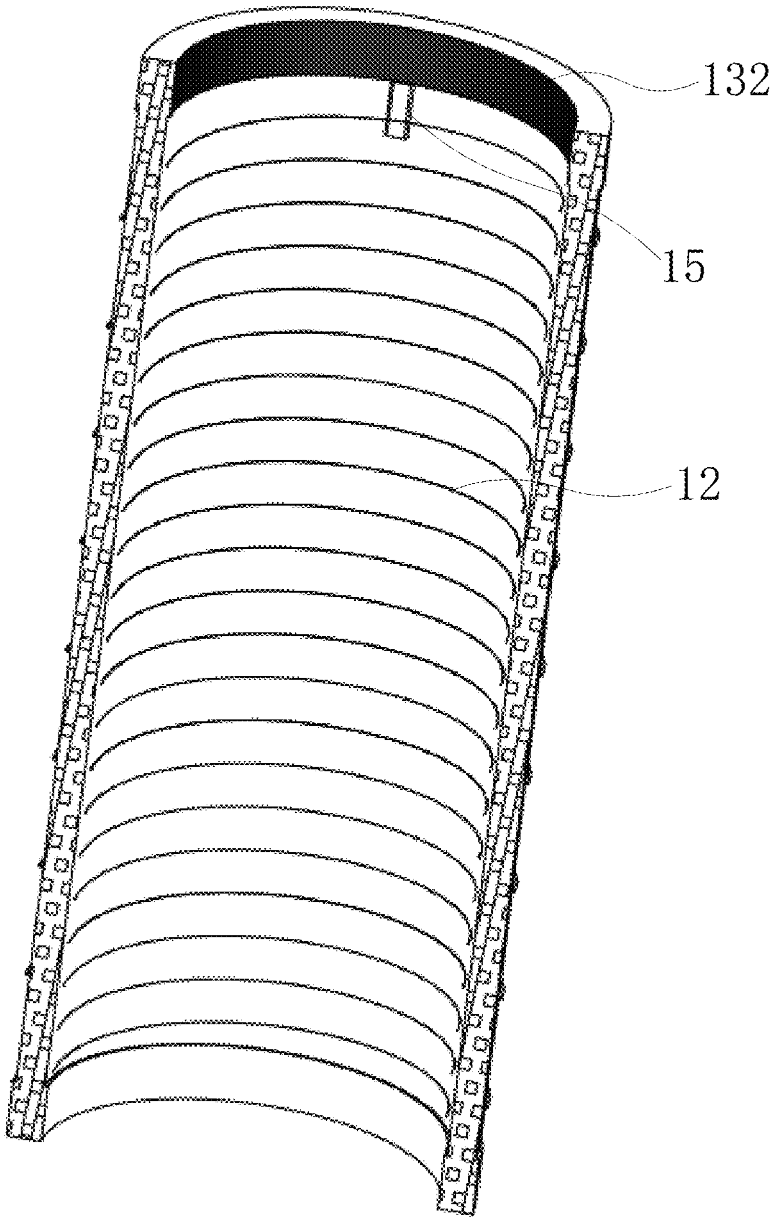
FIG. 2 is a schematic cross-sectional view of the heater according to the first embodiment of the present application.

In an embodiment, the heater 1 further includes a protective structure disposed on the first infrared electrothermal coating 12. Referring to FIG. 2, the protective structure may be a bump 15 arranged on the inner surface of the base, and the bump 15 enables the formation of a gap of less than 1 mm between the first infrared electrothermal coating 12 and the aerosol-forming matrix, thereby preventing the wear of the first infrared electrothermal coating 12 caused by, for example, the movement of the aerosol-forming articles or smoking articles into or out of the cavity. It shall be noted that, the number of the bump 15 is not limited herein, and there may be multiple bumps 15 which may be arranged at any position on the inner surface of the base. It shall be further noted that, the protective structure is not limited to the bump 15 shown in FIG. 2. For example, the protective structure may be a spacer that enables the formation of a gap of less than 1 mm between the first infrared electrothermal coating 12 and the aerosol-forming matrix, and the spacer is arranged on the inner surface of the base. The shape and size of the spacer may match those of the aerosol-forming matrix and the cavity, and for example, the spacer may be a cylindrical and hollow spacer support.

The conductive module includes a first conductive portion 13 and a second conductive portion 14 arranged on the base 11, and both the first conductive portion 13 and the second conductive portion 14 are electrically connected with the first infrared electrothermal coating 12. The conductive module needs to be closely combined with the first infrared electrothermal coating 12 to ensure that the current can flow from the first conductive portion 13 to the second conductive portion 14 through the first infrared electrothermal coating 12 when the conductive module is powered on. In this way, gaps can be avoided, which otherwise would make part of the first infrared electrothermal coating 12 unable to emit infrared rays because it cannot be powered on and thus affect the heating of the aerosol-forming matrix in the cavity by the heater.

Since the first infrared electrothermal coating 12 is coated on the inner surface of the base 11, each of the first conductive portion 13 and the second conductive portion 14 includes a conductive portion coating section disposed on the inner surface of the base 11, a conductive portion electrode section disposed on the outer surface of the base 11, and a conductive portion connecting section connected with the conductive portion coating section and the conductive portion electrode section.

Taking the first conductive portion 13 as an example, referring to FIG. 1, the first conductive portion 13 includes a conductive portion electrode section 131 (shown in gray in the figure) disposed on the outer surface of the base 11, a conductive portion coating section 132 (shown in black in the figure) disposed on the inner surface of the base 11, and a conductive portion connecting section 133 (shown in white in the figure) connected with the conductive portion electrode section 131 and the conductive portion coating section 132. The conductive portion coating section 132 is mainly used to be electrically connected with the first infrared electrothermal coating 12, the conductive portion electrode section 131 is mainly used to be electrically connected with external electrodes, and the conductive portion connecting section 133 is used to be electrically connected with the conductive portion electrode section 131 and the conductive portion coating section 132 respectively. In FIG. 1, the conductive portion connecting section 133 spans the base 11 along the radial direction of the base 11 (i.e., the direction perpendicular to the outer surface or inner surface of the base 11). It shall be noted that, the conductive portion connecting section 133 may be integrated with the conductive portion electrode section 131.

In an embodiment, the first conductive portion 13 and the second conductive portion 14 may be conductive coatings coated on the end of the base 11 by impregnation. The conductive coatings are metal coatings or conductive tapes or the like, and the metal coatings may comprise silver, gold, palladium, platinum, copper, nickel, molybdenum, tungsten, niobium or an alloy material of the above metals. Alternatively, the first conductive portion 13 and the second conductive portion 14 may also be conductive pieces sleeved on the base 1 near the first end and the second end, and the conductive pieces comprise, but not limited to, metal conductive sheets, such as copper sheets, steel sheets or the like.

Figure 3:
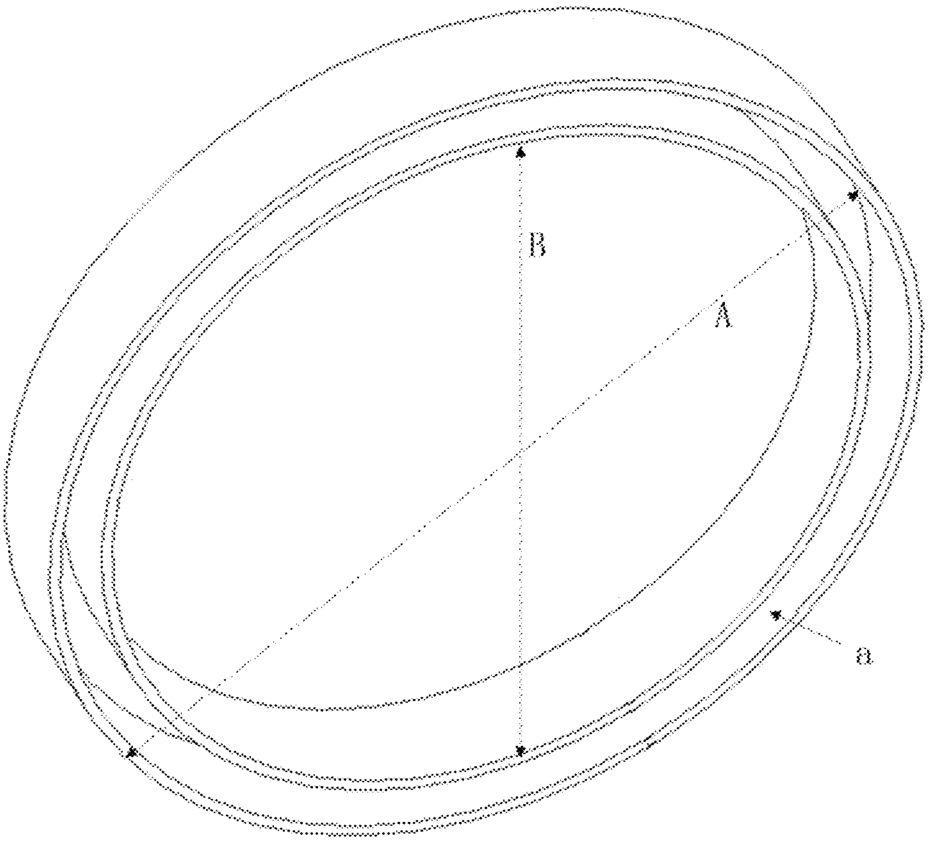
FIG. 3 is a schematic view of a conductive piece in the heater according to the first embodiment of the present application.

Please refer to FIG. 3, and FIG. 3 shows an exemplary annular conductive piece. The outer diameter (labeled by A in the figure) of the annular conductive piece is slightly larger than the outer diameter of the base 11, and the inner diameter (labeled by B in the figure) of the annular conductive piece is slightly smaller than the inner diameter of the base 11. There is a groove (labeled by a in the figure) between the inner diameter and the outer diameter of the annular conductive piece, and the wall of the base 11 may be embedded in the groove. The setting of the inner and outer diameters ensures that the annular conductive piece is sleeved on the base 11 and closely attached to the first infrared electrothermal coating 12.

Figure 4:
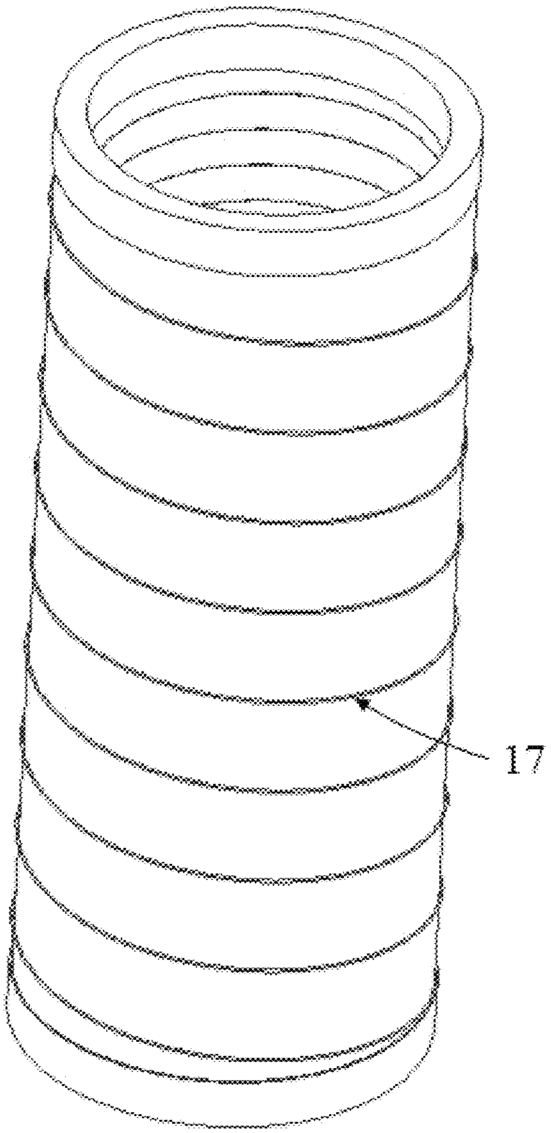
FIG. 4 is a schematic view of a heater having a reflective coating according to the first embodiment of the present application.

Referring to FIG. 4, in an embodiment, the heater 1 further includes a reflective coating 17 coated on the outer surface of the base 11.

In this embodiment, part of the infrared rays generated by the first infrared electrothermal coating 12 will be reflected by the inner surface of the base 11 to the to-be-heated aerosol-forming matrix and absorbed, and part of the infrared rays may be transmitted through the base 11. The reflective coating 17 serves to reflect the infrared rays transmitted through the base 11 back into the base 11 to heat the aerosol-forming matrix inside the base 11. In this way, on the one hand, the effective utilization rate of the infrared rays emitted by the first infrared electrothermal coating 12 is improved, and the heating efficiency is improved; and on the other hand, the effect of heat insulation can be achieved, thereby avoiding the excessively high temperature of the shell of the smoking set, which otherwise would reduce the user experience.

In this embodiment, the reflective coating 17 includes at least one of metal and metal oxide. Specifically, the reflective coating 17 may be made of one or more of gold, silver, nickel, aluminum, gold alloy, silver alloy, nickel alloy, aluminum alloy, gold oxide, silver oxide, nickel oxide and aluminum oxide, titanium oxide, zinc oxide and cerium dioxide. The thickness of the reflective coating 17 ranges from 0.3 μm to 200 μm.

In another embodiment, the heater 1 further includes a hollow heat insulation pipe (not shown in the figure).

The heat insulation pipe is arranged on the periphery of the base 11. The heat insulation pipe can prevent a large amount of heat from being transferred to the shell of the smoking set, which otherwise would make the user feel hot.

In this embodiment, the heat insulation pipe includes heat insulation material, which may be heat insulation glue, aerogel, aerogel felt, asbestos, aluminum silicate, calcium silicate, diatomaceous earth, zirconia or the like. The heat insulation pipe may also include a vacuum heat insulation pipe.

In an embodiment, the heater 1 further includes a temperature acquisition module (not shown in the figure) fixed on the base 11. The temperature acquisition module is configured to acquire the temperature data of the base 11 so as to facilitate the control of the temperature of the heater 1.

In this embodiment, the temperature acquisition module includes a temperature sensor and/or a digital temperature detection module, and the temperature sensor includes, but not limited to, Negative Temperature Coefficient (called for short as NTC), Positive Temperature Coefficient (called for short as PTC) and other temperature sensors. The digital temperature detection module is a temperature detection module of digital output type, reference may be made to the prior art for details thereof, and no limitation is made thereto.

In an embodiment, the heater 1 further includes a second infrared electrothermal coating 16 formed on the outer surface of the base 11. Still referring to FIG. 1 and FIG. 2, both the second infrared electrothermal coating 16 and the first infrared electrothermal coating 12 are coupled between the first conductive portion 13 and the second conductive portion 14 so that the second infrared electrothermal coating 16 and the first infrared electrothermal coating 12 may be power supplied through the first conductive portion 13 and the second conductive portion 14. It shall be noted that, the structure and function of the second infrared electrothermal coating 16 are similar to those of the first infrared electrothermal coating 12, so reference may be made to the related description of the first infrared electrothermal coating 12, and this will not be further described herein.

In this embodiment, the first infrared electrothermal coating 12 and the second infrared electrothermal coating 16 are provided to completely cover the outer and inner surfaces of the base 11 respectively. That is, both the first infrared electrothermal coating 12 and the second infrared electrothermal coating 16 completely overlap with the base 11 in the radial direction. In this way, it can be ensured that the infrared rays radiated to the aerosol-forming matrix received in the cavity provide 360-degree radiation which can completely surround the aerosol-forming matrix in the axial direction, thereby ensuring uniform heating of the aerosol-forming matrix.

Specifically, the first conductive portion 13 is provided to be electrically connected with the first infrared electrothermal coating 12 at the inner surface of the base 11 near the first end 111, and to be electrically connected with the second infrared electrothermal coating 16 at the outer surface of the base 11 near the first end 111. The second conductive portion 14 is provided to be electrically connected to the first infrared electrothermal coating 12 at the inner surface of the base 11 near the second end 112, and to be electrically connected to the second infrared electrothermal coating 16 at the outer surface of the base 11 near the second end 112.

In this embodiment, the first conductive portion 13 includes a first part (not shown in the figure) formed on the inner surface of the base 11, a second part (not shown in the figure) formed on the outer surface of the base 11, and a third part (not shown in the figure) formed on the first end 111 of the base 11. In implementation, the first part at least partially overlaps with the second infrared electrothermal coating 16 so as to be electrically connected with the second infrared electrothermal coating 16. The second part at least partially overlaps with the first infrared electrothermal coating 12 so as to be electrically connected with the first infrared electrothermal coating 12. Two sides of the third part in the radial direction are joined with the first part and the second part respectively.

Furthermore, in implementation, the first part, the second part and the third part are continuous and are integrally formed as a whole conductive piece. Both the first part and the second part are formed in annular shapes on the outer and inner surfaces of the base 11, respectively.

Similar to the first conductive portion 13, the second conductive portion 14 also includes a fourth part (not shown in the figure), a fifth part (not shown in the figure) and a sixth part (not shown in the figure) which are integrally formed as a whole conductive piece.

Furthermore, during use, by means of respectively connected to the power supply through the first conductive portion 13 and the second conductive portion, the first infrared electrothermal coating 12 and the second infrared electrothermal coating 16 are 14, are electrically connected in parallel, thereby reducing the overall resistance of the first infrared electrothermal coating 12 and the second infrared electrothermal coating 16, and increasing the infrared emission efficiency when the output voltage of the power supply is constant.

Figure 5:
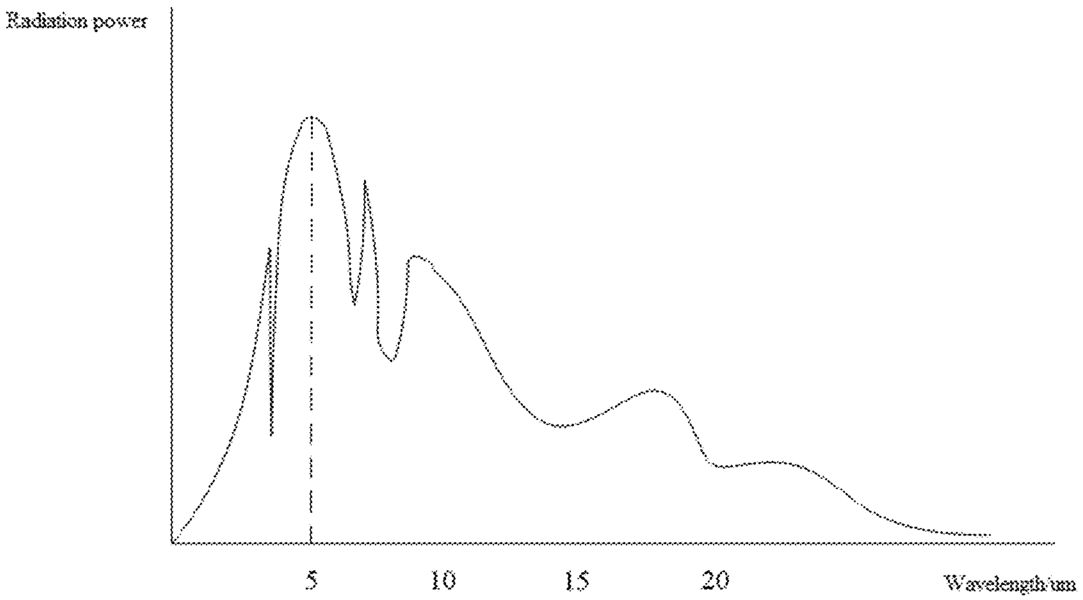
FIG. 5 shows the emission spectrum of infrared rays radiated by a first infrared emitting coating according to the first embodiment of the present application.
Figure 6:
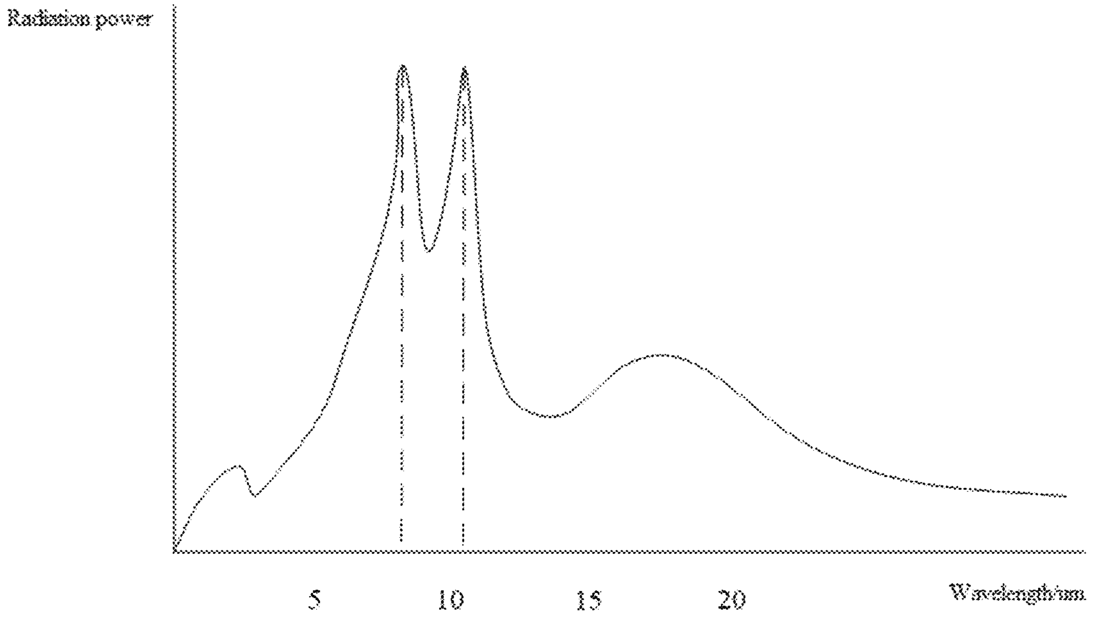
FIG. 6 shows the emission spectrum of infrared rays radiated by a second infrared emitting coating according to the first embodiment of the present application.

Furthermore, the wavelength and efficiency of infrared emission of the first infrared electrothermal coating 12 are different from those of the second infrared electrothermal coating 16. In specific implementation, the aerosol-forming matrix includes different organic components, and these different organic components each have different optimum infrared absorption peaks. For example, the optimum infrared absorption wavelength of nicotine in the aerosol-forming matrix is different from that of glycerin and vegetable glycerin which form aerosol wetting agent. Therefore, in implementation, the first infrared electrothermal coating 12 and the second infrared electrothermal coating 16 emit infrared rays with emission spectra for the above different components respectively. As such, the different peak wavelength ranges of respective emission spectra may promote the heating efficiency. For example, FIG. 5 and FIG. 6 respectively show the emission spectra of infrared rays radiated by the first infrared electrothermal coating 12 and the second infrared electrothermal coating 16 made of two different materials when their own temperatures rise to a certain temperature after being supplied with power. As can be seen from FIG. 5 and FIG. 6, the emission spectra of the first infrared electrothermal coating 12 and the second infrared electrothermal coating 16 have different WLPs (peak wavelength, wavelength corresponding to the maximum radiation power), which may be respectively suitable for the optimum absorption wavelength ranges of different organic components in the aerosol-forming matrix.

In order to avoid the wear of the second infrared electrothermal coating 16 caused by the operations of receiving and removing the aerosol-forming matrix in/out of the cavity during use, in implementation, an infrared transmitting protective layer may further be formed on the second infrared electrothermal coating 16, and the protective layer may be made of infrared transmitting zirconia ceramic paper, glass, polytetrafluoroethylene, glaze or the like.

Alternatively, in other variable examples, a film or coating reflecting infrared rays may further be provided or formed outside the first infrared electrothermal coating 12, and the film or coating may for example be made of gold, silver, nickel, aluminum, gold alloy, silver alloy, nickel alloy, aluminum alloy, gold oxide and silver oxide. The film or coating reflects the infrared rays radiated outward during the operation of the infrared heating pipe into the cavity, thereby improving the utilization efficiency of the infrared rays.

Second Embodiment

Figure 7:
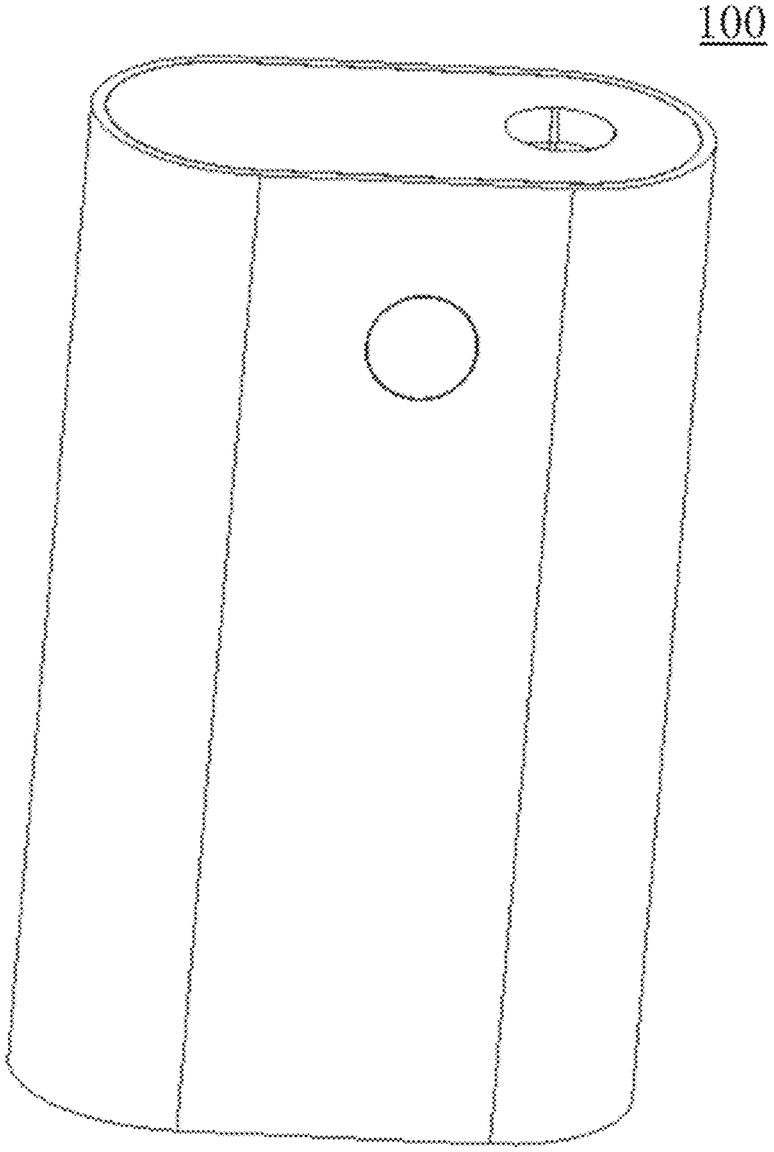
FIG. 7 is a schematic view of a smoking set according to a second embodiment of the present application.
Figure 8:
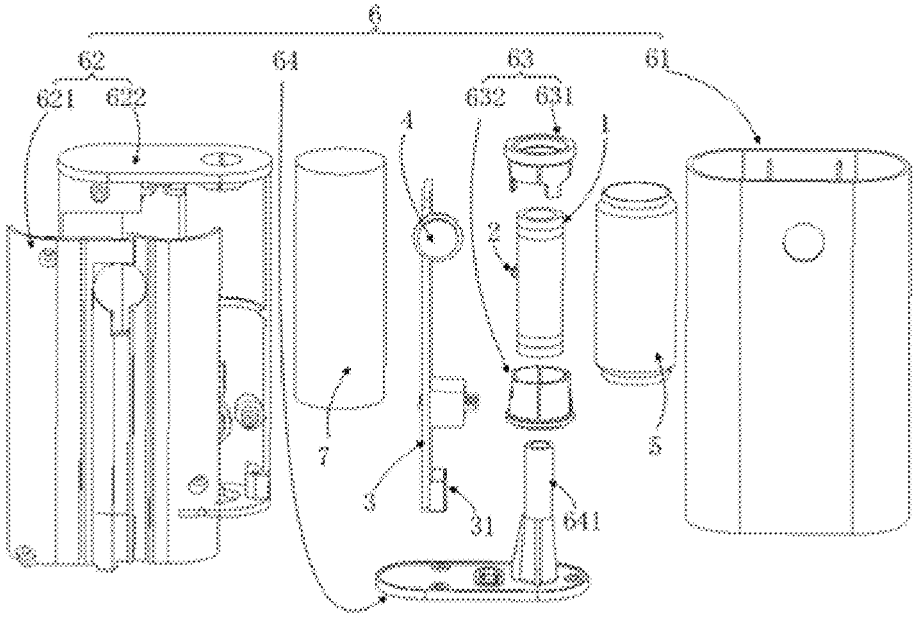
FIG. 8 is a schematic exploded view of the smoking set according to the second embodiment of the present application.

FIG. 7 to FIG. 8 show a smoking set 100 according to the second embodiment of the present application, the smoking set 100 includes a housing assembly 6 and the above-mentioned heater 1, and the heater 1 is arranged within the housing assembly 6. In the smoking set 100 according to the embodiment of the present application, the inner surface of a base 11 is coated with a first infrared electrothermal coating 12 and a first conductive portion 13 and a second conductive portion 14 electrically connected with the first infrared electrothermal coating 12. The first infrared electrothermal coating 12 may emit infrared rays to radiate and heat the aerosol-forming matrix in the cavity of the base 11.

The housing assembly 6 includes a shell 61, a fixing housing 62, a fixing member 63 and a bottom cover 64, and the fixing housing 62 and the fixing member 63 are both fixed in the shell 61. The fixing member 63 is used for fixing the base 11 and is arranged in the fixing housing 62, and the bottom cover 64 is arranged at one end of the shell 61 and covers the shell 61. Specifically, the fixing member 63 includes an upper fixing seat 631 and a lower fixing seat 632, both of which are arranged in the fixing housing 62. The first end and the second end of the base 11 are respectively fixed on the upper fixing seat 631 and the lower fixing seat 632, the bottom cover 64 is convexly provided with an air inlet pipe 641, and an end of the lower fixing seat 632 facing away from the upper fixing seat 631 is connected with the air inlet pipe 641. The upper fixing seat 631, the base 1, the lower fixing seat 632 and the air inlet pipe 641 are coaxially arranged, and the base 11 is sealed with the upper fixing seat 631 and the lower fixing seat 632, the lower fixing seat 632 is further sealed with the air inlet pipe 641, and the air inlet pipe 641 communicates with the air outside so as to facilitate smooth air intake when the user sucks.

The smoking set 100 further includes a main control circuit board 3 and a battery 7. The fixing housing 62 includes a front housing 621 and a rear housing 622, the front housing 621 is fixedly connected with the rear housing 622, the main control circuit board 3 and the battery 7 are both arranged in the fixing housing 62, and the battery 7 is electrically connected with the main control circuit board 3. A key 4 is convexly arranged on the shell 61, and the first infrared electrothermal coating 12 on the inner surface of the base 11 may be turned on or turn off by pressing the key 4. The main control circuit board 3 is further connected with a charging interface 31, and the charging interface 31 is exposed on the bottom cover 64. Users can charge or upgrade the smoking set 100 through the charging interface 31 to ensure the continuous use of the smoking set 100.

The smoking set 100 further includes a heat insulation pipe 5, which is arranged in the fixing housing 62 and sleeved outside the base 11. The heat insulation pipe 5 can prevent a large amount of heat from being transferred to the shell 61, which otherwise would make the user feel hot. Specifically, an infrared reflective coating may further be coated inside the heat insulation tube 5, so as to reflect the infrared rays emitted by the first infrared electrothermal coating 12 on the base 11 back to the interior of the base 11 to heat the aerosol-forming matrix in the cavity, thereby improving the heating efficiency. The infrared reflective coating is similar to the aforementioned reflective coating 17, and thus will not be further described herein.

The smoking set 100 further includes an NTC temperature sensor 2 for detecting the real-time temperature of the base 11 and transmitting the detected real-time temperature to the main control circuit board 3, and the main control circuit board 3 adjusts the magnitude of the current flowing through the first infrared electrothermal coating 12 according to the real-time temperature. Specifically, when it is detected by the NTC temperature sensor 2 that the real-time temperature inside the base 11 is low, e.g., when it is detected that the temperature inside the base 11 is lower than 150° C., the main control circuit board 3 controls the battery 7 to output a higher voltage to the conductive module, thereby increasing the current fed into the first infrared electrothermal coating 12, improving the heating power for the aerosol-forming matrix, and reducing the waiting time for the user to take the first puff. When it is detected by the NTC temperature sensor 2 that the temperature of the base 11 is 150° C. to 200° C., the main control circuit board 3 controls the battery 7 to output a normal voltage to the conductive module 11. When it is detected by the NTC temperature sensor 2 that the temperature of the base 11 is 200° C. to 250° C., the main control circuit board 3 controls the battery 7 to output a lower voltage to the conductive module. When it is detected by the NTC temperature sensor 2 that the temperature inside the base 11 is above 250° C., the main control circuit board 3 controls the battery 7 to stop outputting voltage to the conductive module.

Third Embodiment

Figure 9:
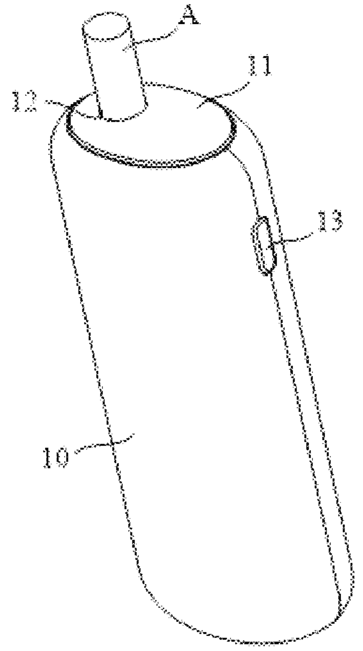
FIG. 9 is a schematic view of an aerosol generating device according to a third embodiment of the present application.
Figure 10:
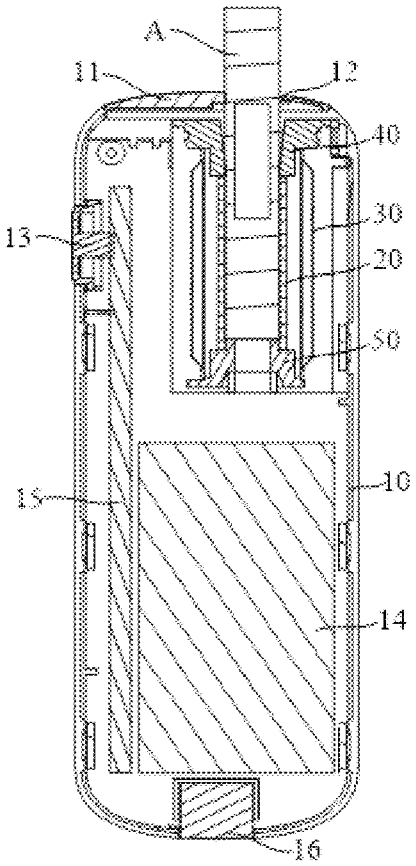
FIG. 10 is a schematic cross-sectional view of the structure of the aerosol generating device shown in FIG. 9.

FIG. 9 to FIG. 10 show an aerosol generating device 1000 according to the third embodiment of the present application. The overall shape of the device is generally constructed as a flat cylinder, and the external members of the aerosol generating device includes: a housing 10, which is hollow inside for forming an assembly space for necessary functional components for infrared radiation or the like; an upper cover 11 located at the upper end of the housing 10 in the lengthwise direction. On the one hand, the upper cover 11 may cover the upper end of the housing 10 so that the appearance of the aerosol generating device is complete and beautiful; and on the other hand, the upper cover 11 may be detached from the upper end of the housing 10, thereby facilitating the installation, detachment and replacement of various functional components in the housing 10.

As can be seen further from FIG. 9 and FIG. 10, the upper cover 11 has an opening 12 through which the aerosol-forming matrix may be at least partially received in the housing 10 to be heated along the lengthwise direction of the housing 10, or the aerosol-forming matrix may be removed from the housing 10 through the opening 12.

The housing 10 is further provided with a switch button 13 on one side in the width direction, and the user may manually manipulate the switch button 13 to control the start or stop of the operation of the aerosol generating device.

Further referring to FIG. 10, the housing 10 is provided therein with: an electric core 14 for supplying power; a control circuit board 15 integrated with a circuit for controlling the operation of the aerosol generating device; a charging interface 16 for charging the electric core 14, such as a USB type-C interface or a Pin type interface or the like, which may charge the electric core 14 after being connected to an external power supply or adapter.

As further shown in FIG. 2 and FIG. 3, in order to heat the aerosol-forming matrix, a heating mechanism is provided within the housing 10. The exploded state of the heating mechanism and the structure of components comprised in the heating mechanism may be as shown in FIG. 3. The heating mechanism includes: a heater 20 having a generally tubular shape extending along the lengthwise direction of the housing 10, wherein the space inside the heater 20 forms a cavity 21 for receiving and heating the aerosol-forming matrix; and the upper end of the tubular shape is open and opposite to the opening 12 of the upper cover 11, so that the aerosol-forming matrix may be received and heated in the cavity 21 or removed from the cavity 21 through the opening 12 of the upper cover 11.

Further, during use, the heater 20 is an electronic heater that generates heat itself and radiates infrared rays into the cavity 21 when it is powered on. Specifically, as shown in FIG. 11 and FIG. 12, the heater 20 includes: a tubular base 22 serving as a rigid carrier and an article containing the aerosol-forming matrix, and a first infrared emitting coating 23 formed on at least a part of the outer surface of the tubular base 22; a second infrared emitting coating 24 formed on at least a part of the inner surface of the tubular base 22.

In an embodiment, the heating mechanism further includes a heat insulation member 30 disposed outside the heater 20 along the radial direction. Referring to FIG. 11 and FIG. 12, in another embodiment, the heat insulation member 30 is a vacuum heat insulation pipe with an internal vacuum area or the like.

Figure 11:
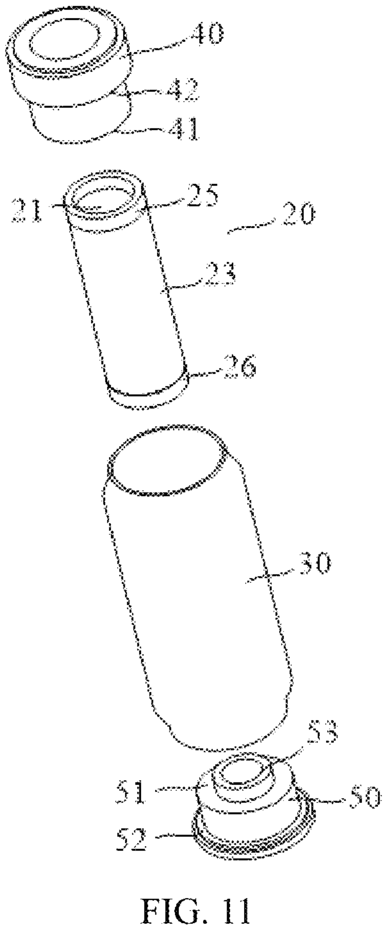
FIG. 11 is a schematic exploded view of a heating assembly shown in FIG. 10.
Figure 12:
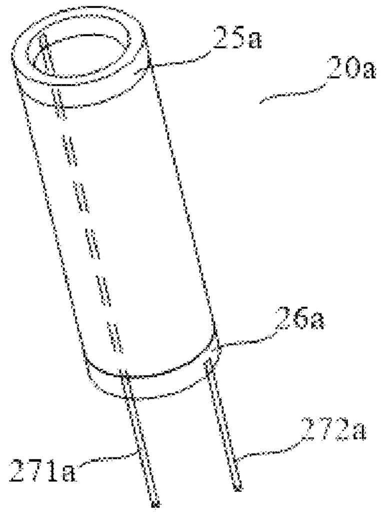
FIG. 12 is a schematic structural diagram of another heater shown in FIG. 9.

Further referring to FIG. 11 and FIG. 12, the heating mechanism further includes an upper support 40 and a lower support 50, both of which are hollow and annular. The upper support 40 and the lower support 50 respectively support two ends of the heater 20 and the heat insulation member 30, so that the heater 20 and the heat insulation member 30 are stably maintained in the housing 10. Specifically, the low support 50 is respectively provided with a first boss 51 and a second boss 52 extending in the axial direction, and during use, the first boss 51 abuts against the second end 220 of the heater 20 so as to support the heat 20 at the second end 220. Similarly, the second boss 52 abuts against the lower end of the heat insulation member 30 so as to support the heat insulation member 30. Meanwhile, the lower support 50 further includes a third boss 53 that extends at least partially into the heater 20, and the third boss 53 occupies part of the space of the cavity 21 so as to form a portion with a reduced inner diameter of the cavity 21, and this portion abuts against and fastens the aerosol-forming matrix.

The upper support 40 includes a fourth boss 41 and a fifth boss 42 that respectively abut against the upper ends of the heater 20 and the heat insulation member 30 so that the heater 20 and the heat insulation member 30 are stably installed in the housing 10.

Based on the heater 1 according to the first embodiment, the first conductive portion 13 and the second conductive portion 14 of the heater 1 may be connected to the positive and negative poles of the power supply by wires, which are sleeved on the first part 131 of the first conductive portion 13 and the fourth part 141 of the second conductive portion 14 respectively so as to realize electrical connection.

In an embodiment, as seen further in FIG. 11 to FIG. 12, the first conductive portion (labeled by 25*a* in FIG. 12) and the second conductive portion (labeled by 26*a* in FIG. 12) at both ends of the heater (labeled by 20*a* in FIG. 12) are respectively supplied with power by conductive pins which are provided by connection means such as welding or the like. Specifically, the first conductive portion 13 and the second conductive portion 14 respectively comprise a first conductive pin connected to the first conductive portion 13 and a second conductive pin connected to the second conductive portion 14.

Correspondingly, in order to facilitate the electrical connection between the above conductive pins and the control circuit board 15, the lower support 50*a* is provided with an axially penetrating channel 54*a* in the implementation. When the heater 1 abuts against the lower support 50*a*, a first conductive pin 271*a* and a second conductive pin 272*a* may penetrate through the channel 54*a* to the outside and connect with the control circuit board 15.

Alternatively, in addition to providing the above-mentioned first conductive portion 13 and second conductive portion 14 for supplying power to the first infrared electrothermal coating 12 and the second infrared electrothermal coating 16, structures such as metal collars with the same structure as the above-mentioned first conductive portion 13 and second conductive portion 14 may also be adopted to contact with the first infrared electrothermal coating 12 and the second infrared electrothermal coating 16 respectively for electrical connection. The metal collar may also comprise three annular parts similar to the first part 131, the second part 132 and the third part 133 describe above, and these three annular parts are respectively in contact and electrical connection with the first conductive portion 13 and the second conductive portion 14 on the inner and outer surfaces of the base 11, thereby realizing power supply.

Fourth Embodiment

Figure 13:
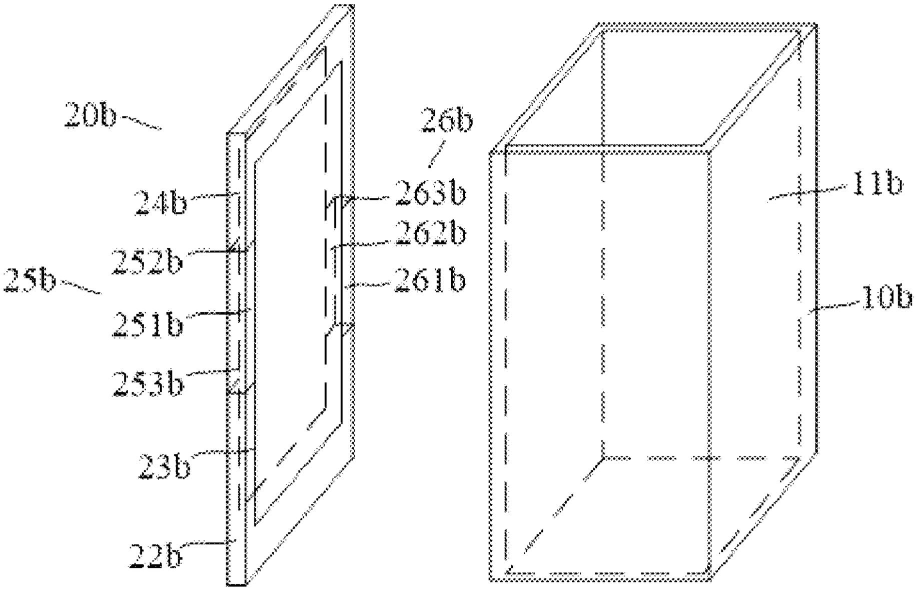
FIG. 13 is a schematic view of an aerosol generating device according to a fourth embodiment of the present application.

FIG. 13 shows an aerosol generating device 100 provided according to the fourth embodiment of the present application, which includes a receiving cylinder 10*b* with one end open and the other end closed. The inner space of the receiving cylinder 10*b* forms a cavity 11*b* for receiving aerosol-forming matrix (not shown in the figure) in the form of powder, particles or the like. Of course, the receiving cylinder 10*b* is made of transparent infrared transmitting materials such as glass and quartz. Further, the heater 20*b* includes: a sheet-like base 22*b*; a first infrared electrothermal coating 23*b*, formed on the first surface of the base 22*b* opposite to the cavity 11*b*; a second infrared electrothermal coating 24*b*, formed on the second surface of the base 22*b* facing away from the cavity 11*b*.

Meanwhile, a first conductive element 25*b* and a second conductive element 26*b* for simultaneously supplying power to the first infrared electrothermal coating 23*b* and the second infrared electrothermal coating 24*b* are respectively arranged on both sides of the sheet-like base 22*b* in the width direction, and the first infrared electrothermal coating 23*b* and the second infrared electrothermal coating 24*b* electronically radiate infrared rays to the smokable material received in the cavity 11*b* so that the material is heated.

Specifically, the first conductive element 25*b* includes a first part 251*b* electrically connected to one side end of the first infrared electrothermal coating 23*b* on the first surface, a second part 252*b* electrically connected to one side end of the second infrared electrothermal coating 24*b* on the second surface, and a third part 253*b* electrically connecting the first part 251*b* and the second part 252*b* into a whole conductive piece on the end side of the sheet-like base 22*b*. Similarly, the second conductive element 26*b* also includes three parts 261*b*/262*b*/263*b*, which are simultaneously electrically connected to the side ends of the first infrared electrothermal coating 23*b* and the second infrared electrothermal coating 24*b* respectively, and form a whole conductive piece themselves.

During the subsequent use, after the first conductive element 25*b* and the second conductive element 26*b* are respectively connected with the positive and negative electrodes of the electric core 14, the first infrared electrothermal coating 23*b* and the second infrared electrothermal coating 24*b* can radiate infrared rays, and the first infrared electrothermal coating 23*b* and the second infrared electrothermal coating 24*b* are electrically connected in parallel, and thus the overall resistance is reduced and the efficiency of infrared emission is increased when the supply voltage is constant.

Alternatively, in other variable implementations, the sheet-like base 22*b* may have an arc shape with proper bending, and thus the opposite first and second surfaces thereof may be configured with an arc shape.

It shall be noted that, the specification and attached drawings of the present application show the preferred embodiments of the present application. However, the present application may be implemented in many different forms, and it is not limited to the embodiments described in this specification. These embodiments are not intended to form additional limitation on the content of the present application, but are provided for a more thorough and comprehensive understanding of the disclosure of the present application. Moreover, the above technical features continue to be combined with each other to form various embodiments not listed above, all of which are regarded as within the scope described in the specification of the present application. Furthermore, those of ordinary skill in the art can make improvements or changes according to the above description, and all these improvements and changes shall fall within the scope claimed in the appended claims of the present application.

What is claimed is:

1. A heater, comprising:

a base, having an inner surface and an outer surface, the inner surface defining a cavity for accommodating aerosol-forming matrix;

a first infrared electrothermal coating, being disposed on the inner surface of the base; the first infrared electrothermal coating being configured to generate infrared radiation to heat the aerosol-forming matrix so as to generate aerosol for smoking;

a conductive module, comprising a first conductive portion and a second conductive portion arranged on the base, both the first conductive portion and the second conductive portion being electrically connected with the first infrared electrothermal coating;

wherein each of the first conductive portion and the second conductive portion comprises a conductive portion coating section arranged on the inner surface of the base and a conductive portion electrode section arranged on the outer surface of the base.

2. The heater according to claim 1, wherein the first conductive portion and/or the second conductive portion further comprise a conductive portion connecting section electrically connecting the conductive portion coating section and the conductive portion electrode section.

3. The heater according to claim 1, wherein the heater further comprises a protective layer coated on the first infrared electrothermal coating and/or a protective structure arranged on the first infrared electrothermal coating to prevent the wear of the first infrared electrothermal coating.

4. The heater according to claim 3, wherein the protective structure is a bump or a spacer arranged on the inner surface of the base, such that a gap within 1 mm is provided between the first infrared electrothermal coating and the aerosol-forming matrix.

5. The heater according to claim 3, wherein the protective layer comprises at least one of a polytetrafluoroethylene layer and a glaze layer.

6. The heater according to claim 1, wherein the heater further comprises a reflective coating coated on the outer surface of the base and the reflective coating is configured to reflect infrared rays transmitted through the base.

7. The heater according to claim 6, wherein the reflective coating comprises at least one of metal and metal oxide.

8. The heater according to claim 7, wherein the thickness of the reflective coating is 0.3 μm to 200 μm.

9. The heater according to claim 1, wherein the first conductive portion and the second conductive portion are at least one of a conductive coating coated on an end of the base and a conductive piece sleeved on the end of the base.

10. The heater according to claim 1, wherein the heater further comprises a temperature acquisition module configured to acquire temperature data of the base.

11. The heater according to claim 1, wherein the heater further comprises a second infrared electrothermal coating provided on the outer surface of the base;

both the first infrared electrothermal coating and the second infrared electrothermal coating are coupled between the first conductive portion and the second conductive portion, such that the first infrared electrothermal coating and the second infrared electrothermal coating are power supplied through the first conductive portion and the second conductive portion.

12. The heater according to claim 11, wherein the base has a first end and a second end opposite to each other;

wherein the first conductive portion is provided to be electrically connected with the first infrared electrothermal coating at the inner surface of the base near the first end, and electrically connected with the second infrared electrothermal coating at the outer surface of the base near the first end;

the second conductive portion is provided to be electrically connected with the first infrared electrothermal coating at the inner surface of the base near the second end, and electrically connected with the second infrared electrothermal coating at the outer surface of the base near the second end.

13. The heater according to claim 12, wherein the first conductive portion comprises a first part provided on the inner surface of the base and a second part provided on the outer surface of the base;

wherein the first part is electrically connected with the first infrared electrothermal coating; and the second part is electrically connected with the second infrared electrothermal coating.

14. The heater according to claim 13, wherein the first conductive portion further comprises a third part formed at the first end of the base, and the first part, the second part and the third part are continuous and in electrical connection.

15. The heater according to claim 11, wherein the infrared rays radiated by the first infrared electrothermal coating and the infrared rays radiated by the second infrared electrothermal coating have different emission spectra.

16. The heater according to claim 15, wherein the emission spectrum of the infrared rays radiated by the first infrared electrothermal coating has a peak wavelength different from the emission spectrum of the infrared rays radiated by the second infrared electrothermal coating.

17. An aerosol generating device, comprising a heater; the heater comprising:

a base, having an inner surface and an outer surface, the inner surface defining a cavity for accommodating aerosol-forming matrix;

a first infrared electrothermal coating, being disposed on the inner surface of the base; the first infrared electrothermal coating being configured to generate infrared radiation to heat the aerosol-forming matrix so as to generate aerosol for smoking;

a conductive module, comprising a first conductive portion and a second conductive portion arranged on the base, both the first conductive portion and the second conductive portion being electrically connected with the first infrared electrothermal coating;

wherein each of the first conductive portion and the second conductive portion comprises a conductive portion coating section arranged on the inner surface of the base and a conductive portion electrode section arranged on the outer surface of the base.

* * * * *